United States Patent Office 3,063,025
Patented Nov. 6, 1962

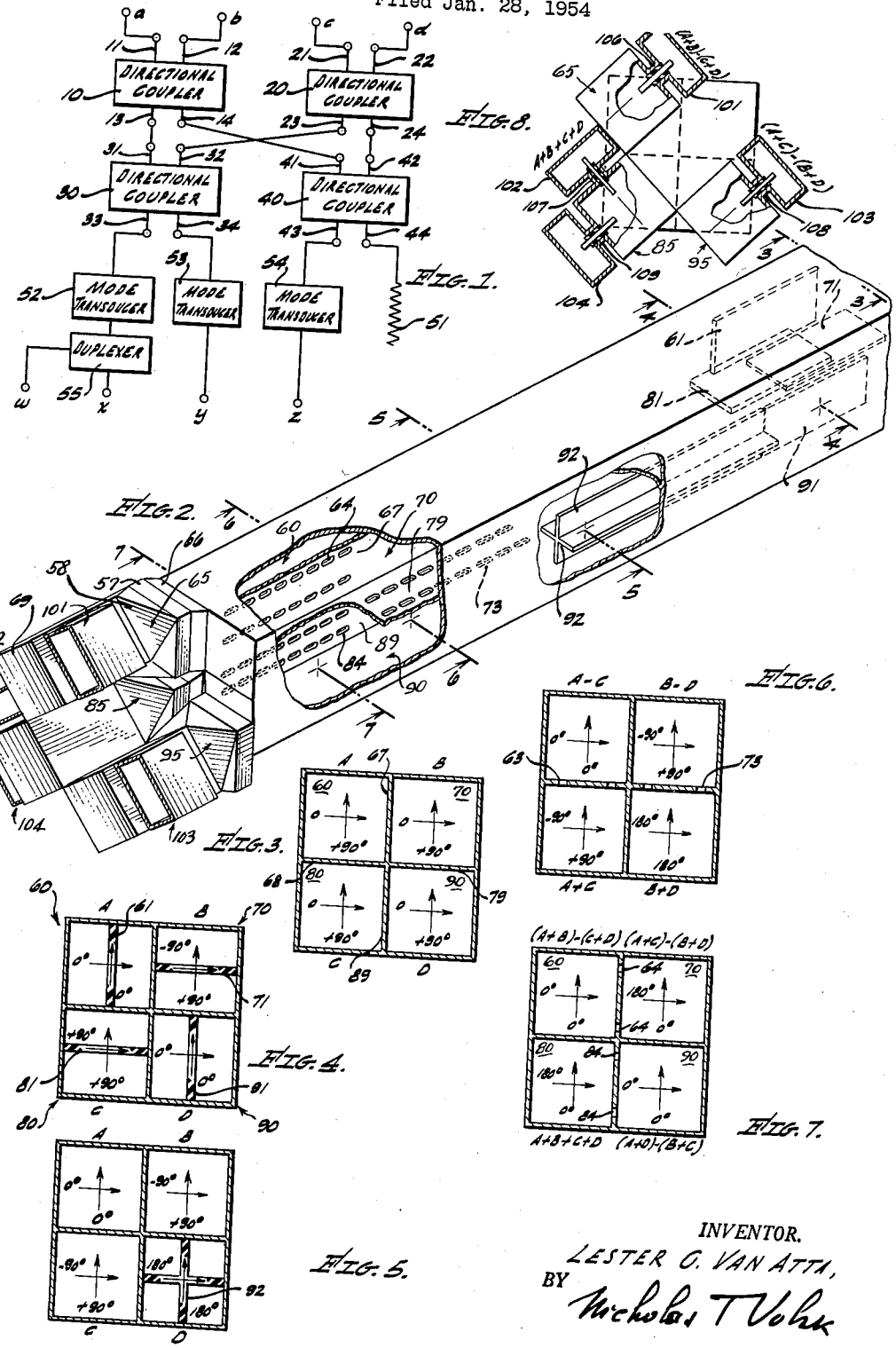

3,063,025
WAVEGUIDE NETWORK
Lester C. Van Atta, Pacific Palisades, Calif., assignor to Hughes Aircraft Company, Culver City, Calif., a corporation of Delaware
Filed Jan. 28, 1954, Ser. No. 406,701
10 Claims. (Cl. 333—6)

This invention relates generally to waveguides for electromagnetic waves and, more particularly, to an antenna coupling network for use in a radar system of the simultaneous lobe comparison type.

It has often been found desirable to automatically track an isolated target by means of a simultaneous lobe comparison radar system thereby avoiding the difficulties associated with antenna scanning. In a radar system of this type, signal pulses are directed toward a target in space by means of an antenna having four distinct radiating elements. Consequently, for each target echo of a transmitted pulse, four signal components are received by the antenna elements. By combining these signal components in a waveguide network, coupled to the antenna, it is then possible to produce error signals representative of the bearing of the target.

More particularly, a conventional simultaneous lobing antenna comprises a parabolic reflector and four identical radiating elements arranged in a square. Since the center of the square is made substantially coincident with the focus of the reflector, signal pulses fed to the radiating elements are reflected in the form of a relatively narrow beam of pulsed radiant energy. Assuming that the beam is intercepted by an isolated target positioned on the axis of the beam, and at a distance not exceeding the range capabilities of the system, four signal components of equal amplitude and phase will be received by the radiating elements for each echo of a radiated pulse. If, on the other hand, the target is located off the axis of the beam, there will be received four signal components having amplitudes and phases which differ from each other in accordance with the bearing of the target relative to the axis of the beam. To locate the target in this event, the signal components are variously added and subtracted by the waveguide network in a manner to produce the required error signals. If the signal components be designated A, B, C, and D, these error signals comprise the combinations $[(A+B)-(C+D)]$, and $[(A+C)-(B+D)]$.

Recently, it has been recognized that certain advantages may be obtained if circularly polarized wave pulses are radiated by the antenna rather than linearly polarized wave pulses as was the practice hitherto. In this way, there is effected a reduction in amplitude fluctuations of the echo pulses caused by changes in the aspect of the target. Also false indications of a target due to the presence of raindrops are minimized.

It is an object of this invention, therefore, to provide a waveguide network which supplies equal amounts of circularly polarized wave energy to the radiating elements of a simultaneous lobing antenna, and which derives from the signal components of a target echo received by the antenna, error signals representative of the bearing of the target.

It is another object of this invention to provide a waveguide network which serves to convert linearly polarized wave energy to circularly polarized wave energy, and which distributes the circularly polarized wave energy equally to four separate terminals.

It is a further object to provide a sum and difference circuit which operates on four signal components, A, B, C, and D, consisting of circularly polarized wave pulses to produce in the form of linearly polarized wave pulses the combinations $[A+B+C+D]$, $[(A+B)-(C+D)]$, and $[(A+C)-(B+D)]$.

The novel features which are believed to be characteristic of this invention, both as to its organization and method of operation, together with further objects and advantages thereof, will be better understood from the following description considered in connection wtih the accompanying drawings in which:

FIG. 1 is a block diagram of the waveguide network according to this invention;

FIG. 2 is a perspective view of a structural embodiment of the waveguide network illustrated in block form in FIG. 1; and FIGS. 3 through 8 are sectional views taken on lines 3—3 through 8—8 of FIG. 2.

Referring now to the drawing wherein like elements are designated by the same reference characters, and, more particularly, to FIG. 1, the waveguide network of this invention is seen to include directional couplers 10, 20, 30, and 40. Also included in the waveguide network is a resistive load 51, a duplexer 55, three mode transducers, 52, 53, 54, and eight terminals $a$, $b$, $c$, $d$, $w$, $x$, $y$, and $z$ comprising the terminal ends of the waveguide network. Each of the directional couplers has four arms, designated 11–14, 21–24, 31–34, and 41–44, and each is designed to transfer electromagnetic energy from any one arm to two other arms in equal proportions. Therefore, directional couplers 10, 20, 30, and 40 are also operable as hybrid junctions to the extent that one pair of arms, such as arms 11 and 12, or arms 13 and 14, may be readily adapted to provide the individual sum and difference of signals applied simultaneously to the other pair of arms.

The manner in which the above-described elements are interconnected is as follows. Arms 11, 12, 21, and 22 of hybrid junctions 10 and 20 are connected to terminals $a$, $b$, $c$, and $d$, respectively, and arms 13, 14, 23, 24 of hybrid junctions 10 and 20 are connected to arms 31, 41, 32, and 42, respectively, of hybrid junctions 30 and 40. The remaining arms of hybrid junctions 30 and 40, namely, arms 33, 34, 43, 44, connect with mode transducers 52, 53, 54, and resistive load 51, respectively. To complete the network, terminals $w$ and $x$ are selectively coupled to mode transducer 52 by means of duplexer 55, and terminals $y$ and $z$ are connected directly to mode transducers 53 and 54, respectively.

The operation of the waveguide network with respect to four signal components, A, B, C, and D, apply to terminals $a$, $b$, $c$, and $d$, respectively, may be readily understood with further reference to FIG. 1. Thus, signal components A, B, C, and D are first presented to arms 11, 12, 21, and 22 of directional couplers 10 and 20, respectively. By virtue of the hybrid operation of directional coupler 10, there are produced in arms 13 and 14, thereof, the complex sum $(A+B)$ and the complex difference $(A-B)$, respectively. Similarly, arms 23 and 24 of directional coupler 20 provide the sum $(C+D)$ and the difference $(C-D)$. The sums, $(A+B)$ and $(C+D)$, are then combined in directional coupler 30 to produce one of the required error signals $[(A+B)-(C+D)]$, and a range signal $$[A+B+C+D]$$

whereas the differences $(A-B)$ and $(C-D)$ are combined in directional coupler 40 to produce the other error signal $[(A+C)-(B+D)]$. Finally, signals $$[A+B+C+D]$$

$[(A+B)-(C+D)]$, and $[(A+C)-(B+D)]$ are applied to mode transducers 52, 53, and 54, respectively, for transmission to terminals $x$, $y$, and $z$, respectively. The further combination $[(A+D)-(B+C)]$, which appears in arm 44 of directional coupler 40, is ordinarily unused and may be dissipated in resistive load 51 as shown.

It may also be observed that when a wave energy signal W is supplied to terminal w, it is first transmitted through duplexer 55, and mode transducer 52 to arm 33 of directional coupler 30 and then divided equally in arms 31 and 32. Similarly, the wave energy in each of the arms 31 and 32 is transmitted to arms 13 and 23 of directional couplers 10 and 20 where it is once again divided equally. There is produced in arms 11, 12, 21, and 22, therefore, the equal portions of signal W required to feed four antenna elements in identical fashion. As is apparent, terminals a, b, c, and d now serve as output terminals for connection with the respective antenna elements.

Referring to FIGS. 2 through 8, the waveguide network of this invention in structural form is seen to include four waveguides 60, 70, 80, and 90 of square cross section. Waveguide 60 overlies waveguide 80 and is separated therefrom by a common wall 68. Waveguides 70 and 90, which are similarly disposed relative to one another, share a common wall 79. Finally, waveguides 70 and 90 are positioned adjacent waveguides 60 and 70, respectively, there being an additional pair of common walls 67 and 89, separating waveguides 70 and 90 from waveguides 60 and 80, respectively.

Included in a longitudinal region of the respective waveguides towards the right of FIG. 2, are 90° phase shifters 61, 71, 81, and 91. Each of the phase shifters consists of a dielectric plate extending between one pair of opposite waveguide walls, equidistant from the other pair of walls so as to form a partition or septum within the waveguide. As shown in detail in FIG. 4, phase shifters 61 and 91 of waveguides 60 and 90, respectively, are oriented parallel to each other and perpendicular to the remaining phase shifters 71 and 81 of waveguides 70 and 80, respectively. Proceeding towards the left of FIG. 2, there is provided in the next succeeding longitudinal region of waveguide 90 a 180° phase shifter 92. Phase shifter 92 consists of two dielectric plates, each of which bisects the other at right angles, and one of which extends in the same plane as phase shifter 91 as shown in FIG. 4 and FIG. 5.

In adjacent longitudinal regions of waveguides 60, 70, 80, and 90 following the region wherein phase shifter 92 is located, common walls 68 and 79 include identical groups of slot-shaped apertures 63 and 73, respectively, shown in cross section in FIG. 6 and in part in FIG. 2. As described in detail in the copending application of Louis A. Kurtz, Serial No. 309,262, filed September 12, 1952, now Patent No. 2,817,063, slots 63 are arranged in two rows with their axes parallel to the longitudinal axes of the waveguides. Also, the lines joining the centers of the slots in each row are equidistant from the longitudinal center line of common wall 68. By means of this arrangement, waveguides 60 and 70 may be directionally coupled to waveguides 80 and 90, respectively, and the amount of coupling adjusted so that one-half the wave energy in any one waveguide is directionally transmitted to the adjacent waveguide for both the $TE_{10}$ and $TE_{01}$ modes of propagation: i.e., 3 db directional coupling may be provided for both modes. To this end, the distance separating the rows of slots 63 is made equal to approximately 5/8 the transverse dimension of the waveguides, and the number of slots utilized is sixteen, each slot being approximately 0.34 wavelengths long. Since the length of slots 63 and 73 relative to the size of the waveguides and the operating frequency will greatly influence the total number of slots required, however, it will be apparent to those skilled in the art that a greater or lesser number of slots may also be used. In this event, a slightly different spacing between rows will also be required.

In the remaining longitudinal regions of waveguides 60, 70, 80, and 90 towards the left of FIG. 2, common walls 67 and 89 include two additional groups of slots 64 and 84, respectively. Slots 64 and 84, shown in FIGS. 2 and 7, are arranged in the same manner as slots 63 and 73 and operate in like fashion with respect to the adjacent waveguides to which they are common. Accordingly, slots 64 serve to directionally intercouple waveguides 60 and 70, whereas slots 84 directionally intercouple waveguides 80 and 90.

Coupled to the ends of waveguides 60, 80, and 90, respectively, toward the left of FIG. 2 are mode transducers 65, 85, and 95, each one consisting of a waveguide formed in four sections and having one end closed. Since the closed terminal sections of the mode transducers are like waveguides 60, 80, and 90 with their respective transverse axes rotated 45° as shown in FIG. 8, it is the function of the remaining three sections to provide both twists and jogs for adapting the terminal sections to the respective waveguides 60, 80, and 90. By way of illustration, it will be seen from FIG. 2 that a first section 66 of mode transducer 65 provides a jog to the left of waveguide 60, and a second section 57 provides a jog upwards. In this way, waveguide 60 is effectively extended up and to the left so as to prevent mechanical interference with the remaining mode transducers. The fourth or terminal section 69 of mode transducer 65 is then joined to section 57 by a transitional third section 58. Section 58, which in effect provides the 45° rotation, is formed with planar walls as shown in FIG. 2.

With reference to FIG. 8, it will be seen that three rectangular waveguides 101, 102, and 103 are, in turn, coupled to the respective mode transducers 65, 85, and 95 by means of probe structures 106, 107, and 108. Also, an additional rectangular waveguide 104 is coupled to waveguide 85 with a probe structure 109. Although the details of probe structures of this general type are well known, it is most significant that probe structures 106, 107, and 108 are disposed parallel to one another whereas probe structure 109 and probe structure 107 are related perpendicularly. The reason for these particular orientations of the probe structures will become apparent from a description of the operation of the waveguide network which is as follows.

Signals A, B, C, and D consisting of circularly polarized wave pulses are presented to the respective waveguides 60, 70, 80, and 90 towards the right of FIG. 2. As shown in FIG. 3, A, B, C, and D each may be represented in terms of two component electric vectors disposed orthogonally in space and differing in time phase by 90°. Traveling down the respective waveguides towards the left of FIG. 2, signals A, B, C, and D first encounter 90° phase shifters 61, 71, 81, and 91, respectively. Each of these phase shifters retards the phase of the component electric vector oriented parallel thereto to give it a phase shift of −90° with respect to the other component vectors. Therefore in traversing phase shifters 61, 71, 81, and 91, each of the signals A, B, C, and D has one of its component electric vectors changed in phase by −90° as shown vectorially in FIG. 4. Signal D, propagating in waveguide 90 from right to left, next passes through 180° phase shifter 92. Since phase shifter 92 includes two dielectric plates at right angles to one another and respectively parallel to the component vectors of signal component D, both component electric vectors of signal D are shifted in phase by a −180° with respect to A, B, and C as shown in FIG. 5. The phases of A, B, and C in FIG. 5 remain the same as in FIG. 4, since only relative phase changes of the various signals are indicated.

Continuing towards the left of FIG. 2, signals A and C are next combined by slot group 63 in common wall 68. Since signal A has each of its component vectors 90° out of phase with respect to the component vectors of signal C, and since slot group 63 directionally transmits to waveguide 80 one-half the wave energy in waveguide 60 and vice versa, operation like that of a hybrid junction takes place. That is to say, slots 63 serve to add signals A and C in waveguide 80 and provide the difference $(A-C)$ in waveguide 60, as shown in FIG. 6. The phases of the combined signals $(A+C)$ and $(A-C)$ are determined by the phases of signals A and C, and by the phase shift produced by the slots themselves. With regard to the effects of slots 63, the component vectors of A and B parallel to wall 79 are delayed 90° in transfer between waveguides 60 and 80, whereas the component vectors of A and B perpendicular to wall 68 are advanced 90°. As a result, the component vectors of combined signals $(A+C)$ and $(A-C)$ are as shown in FIG. 6. Applying the same criteria to signals B and D in waveguides 70 and 90, respectively, it will be seen from FIG. 6 that slots 73 in common wall 68 serve to both add and subtract signals B and D. Consequently, as shown in FIG. 6, there is produced in waveguide 90, the combined signal $(B+D)$ and in waveguide 70 the combined signal $(B-D)$.

As shown in FIG. 7 $(A+C)$, $(A-C)$, $(B+D)$, and $(B-D)$ are then recombined by means of slot groups 64 and 84 formed in walls 67 and 89, respectively, to produce error signals $[(A+B)-(C+D)]$ in waveguide 60, $[(A+C)-(B+D)]$ in waveguide 70, and range signal $[A+B+C+D]$ in waveguide 80. As before, the component vectors parallel to the respective slotted waveguide walls 67 and 89 undergo a 90° phase lag in transfer between waveguides 60 and 70 and between waveguides 80 and 90, whereas the component vectors perpendicular to the respective slotted walls undergo a 90° phase advance. The remaining combination $[(A+D)-(B+C)]$ in waveguide 90 is unused, and may be absorbed by a conventional resistive load, not shown, provided at the end of waveguide 90 toward the left of FIG. 2.

With particular reference to FIG. 7, it may also be observed that the component electric vectors of each error signal are either in phase with one another, or 180° out of phase. The same is also true of the range signal. Since the resultant electric vectors are therefore always disposed at a 45° angle with respect to their components, the individual error signals and the range signal may be regarded as propagating in $TE_{10}$ and $TE_{01}$ modes of equal amplitude and phase. Accordingly, the range and error signals at this point in the waveguide network consist of plane polarized waves wherein the resultant electric vectors are oriented on diagonals of the respective waveguides. To reorient the resultant electric vectors perpendicular to a pair of waveguide walls, the signals are then passed through mode transducers 65, 85, and 95 which, in effect, provide a 45° waveguide rotation. As shown in FIG. 8, the mode of propagation of signals $$[(A+B)-(C+D)] \text{ and } [(A+C)-(B+D)]$$

may now be regarded as the $TE_{01}$ mode, whereas $[A+B+C+D]$ may be regarded as a $TE_{10}$ mode signal. Finally, the signals are transferred to the individual rectangular waveguides 101, 102, and 103 by means of probe structures 106, 107, and 108, respectively, for transmission to a receiver. Signal $[A+B+C+D]$ is excluded from waveguide 104 because probe structure 109 extending between waveguide 104 and waveguide 80 is oriented at right angles to the resultant electric vector of this signal.

Thus far the operation of the waveguide network has been described with respect to four signals, A, B, C, and D, in the form of circularly polarized waves. It remains to describe how the waveguide network operates on a signal W comprising linearly polarized waves in the $TE_{01}$ mode. In this case, signal W is first presented to rectangular waveguide 104 at the left of FIG. 2 and then transferred to mode transducer 85 by means of probe structure 109. Signal W is excluded from waveguide 102, in this case, owing to the orientation of probe structure 107. In connecting with waveguide 80, mode transducer 85 provides a 45° waveguide rotation as before with the result that signal W is transmitted to waveguide 80 with component electric vectors disposed at right angles to the waveguide walls. Thus, mode transducer 85 operates in this case to convert from the $TE_{01}$ mode to a diagonal mode which in essence comprises both the $TE_{10}$ and the $TE_{01}$ modes. Towards the right of FIG. 2, signal W next encounters slot group 84 which serves to directionally transmit one-half the wave energy of signal W to wave guide 90. In like manner, the wave energy in waveguides 80 and 90 is partially transmitted to waveguides 60 and 70, respectively. As a result there exists in waveguides 60, 70, 80, and 90 four wave trains of equal amplitude propagating in both the $TE_{10}$ and $TE_{01}$ modes. It remains only for phase shifters 61, 71, 81, 91, and 92, therefore, to equalize the phases of the wave trains with respect to one another, and to delay one of the modes of each wave train by 90°. In this way, the linearly polarized waves are converted to circularly polarized waves for transmission to an antenna.

Although the arrangement of slots 63, 64, 73, and 84 has proven most satisfactory, it will be apparent to those skilled in the art that other arrangements of slots will also be suitable provided that 3 db coupling is obtained for both $TE_{10}$ and $TE_{01}$ mode wave energy.

What is claimed as new is:

1. A waveguide network comprising first, second, and third mode transducers for converting $TE_{10}$ mode electromagnetic waves to $TE_{01}$ and $TE_{10}$ mode electromagnetic waves of equal amplitude and phase, first, second, and third waveguides of square cross section coupled to the respective mode transducers, a fourth waveguide of square cross section, said first and second waveguides each having one wall common to said third waveguide and another wall common to said fourth waveguide, said common walls each being provided with a group of apertures to directionally couple a first longitudinal region of said first waveguide to a first longitudinal region of said third waveguide and a first longitudinal region of said second waveguide to a first longitudinal region of said fourth waveguide, and to directionally couple a second longitudinal region of said first waveguide to a second longitudinal region of said fourth waveguide and a second longitudinal region of said second waveguide to a second longitudinal region of said third waveguide, and means coupled to said first, second, and fourth waveguides for converting $TE_{01}$ and $TE_{10}$ electromagnetic waves to circularly polarized electromagnetic waves.

2. A waveguide network comprising first, second, third, and fourth waveguides of square cross section, said first and second waveguides each having one wall common to said third waveguide and another wall common to said fourth waveguide, said common walls each being provided with a group of apertures to directionally couple said first waveguide to said third waveguide and said second waveguide to said fourth waveguide at first respective longitudinal regions thereof, and to directionally couple said first waveguide to said fourth waveguide and said second waveguide to said third waveguide at second respective longitudinal regions thereof, and first, second, and third transitional waveguide sections joined to said first, second, and third waveguides, respectively, and having terminal ends of square cross section, the transverse axes of the respective terminal ends being oriented at a 45° angle with respect to the transverse axes of the respective waveguides.

3. A waveguide network according to claim 2 wherein the apertures provided in each one of said common walls are arranged in two rows, the line joining the centers of the apertures in one row, and the line joining the centers of the apertures in the other row being parallel to the longitudinal centerline of said one of the common walls and being spaced equal distances therefrom.

4. A waveguide network according to claim 2 wherein said first waveguide includes means for retarding the phase of $TE_{10}$ and $TE_{01}$ mode electromagnetic waves by 180°, said first and said fourth waveguides include means for retarding the phase of $TE_{10}$ mode electromagnetic waves by 90°, and said second and third waveguides include means for retarding the phase of $TE_{01}$ mode electromagnetic waves by 90°.

5. A waveguide network comprising first and second waveguides of square cross section disposed parallel and adjacent one another and being separated by a first common waveguide wall, third and fourth waveguides of square cross section disposed parallel and adjacent one another and being separated by a second common waveguide wall, said third and fourth waveguides having third and fourth waveguide walls common to said first and second waveguides, respectively, said first and second common walls being provided with apertures in a first longitudinal region of said waveguides and said third and fourth common walls being provided with apertures in a second longitudinal region of said waveguides, first and second dielectric plates positioned in a third longitudinal region of said first waveguide and disposed at right angles to one another, said first dielectric plate extending between one pair of parallel waveguide walls of said first waveguide equidistant from the other pair of parallel waveguide walls, and said second dielectric plate extending between said other pair of waveguide walls equidistant from said one pair of waveguide walls, third, fourth, fifth, and sixth dielectric plates in a fourth longitudinal region of said first, second, third, and fourth waveguides, respectively, each extending between one pair of parallel waveguide walls of the respective waveguides equidistant from the other pair of parallel waveguide walls, said third and fifth dielectric plates extending in planes perpendicular to said fourth and sixth dielectric plates and first, second, and third transitional waveguide sections joined to said first, second, and third waveguides, respectively, the respective open or terminal ends of said transitional waveguide sections being square in cross section and having their transverse axes oriented at 45° angles to the transverse axes of said first, second, and third waveguides, respectively.

6. A waveguide network according to claim 5 wherein the apertures provided in each one of said first, second, third, and fourth common walls are arranged in two rows, the line joining the centers of the apertures in one row, and the line joining the centers of the apertures in the other row being parallel to the longitudinal centerline of said one of the common walls and being spaced equal distances therefrom.

7. A waveguide network according to claim 6 wherein said apertures are shaped in the form of slots having their axes parallel to the longitudinal axes of said waveguides.

8. A waveguide network comprising first and second waveguides of square cross section disposed parallel and adjacent one another and being separated by a first common waveguide wall, third and fourth waveguides of square cross section disposed parallel and adjacent one another and being separated by a second common waveguide wall, said third and fourth waveguides having third and fourth waveguide walls common to said first and second waveguide, respectively, said first and second common walls being provided with slots in a first longitudinal region of said waveguides and said third and fourth common walls being provided with slots in a second longitudinal region of said waveguides, first and second dielectric plates positioned in a third longitudinal region of said first waveguide to retard the phase of $TE_{10}$ and $TE_{01}$ mode electromagnetic waves by 180°, said first dielectric plate extending between one pair of parallel waveguide walls of said first waveguide equidistant from the other pair of parallel waveguide walls, and said second dielectric plate extending between said other pair of waveguide walls equidistant from said one pair of waveguide walls, third, fourth, fifth, and sixth dielectric plates in a fourth longitudinal region of said first and second, third and fourth waveguides, respectively, for retarding the phase of electromagnetic waves by 90°, each of said dielectric plates extending between one pair of parallel waveguide walls of the respective waveguides equidistant from the other pair of parallel walls, said third and fifth dielectric plates being oriented to retard the phase of $TE_{10}$ mode electromagnetic waves and said fourth and sixth dielectric plates being oriented to retard the phase of $TE_{01}$ mode electromagnetic waves; and first, second, and third transitional waveguide sections joined to said first, second, and third waveguides, respectively, the respective open or terminal ends of said transitional waveguide sections being square in cross section and having their transverse axes oriented in space at 45° angles to the transverse axes of said first, second, and third waveguides, respectively.

9. A waveguide network comprising a first directional coupler consisting of first and second waveguide sections having a common apertured wall, said first and said second waveguide sections being coupled to a first and a second mode transducer, respectively, a second directional coupler consisting of third and fourth waveguide sections having a common apertured wall and being disposed parallel and adjacent said first and said second waveguide sections, respectively, said third waveguide section being coupled to a third mode transducer, a third directional coupler consisting of fifth and sixth waveguide sections forming collinear extensions of said first and second waveguide sections, respectively, and having a common apertured wall at right angles to the common wall of said first and second waveguide sections, a fourth directional coupler consisting of seventh and eighth waveguide sections forming collinear extensions of said third and fourth waveguide sections, respectively, and having a common apertured wall at right angles to the common wall of said third and fourth waveguide sections, ninth, tenth, and eleventh waveguide sections of square cross section having their respective transverse axes oriented at 45° angles with respect to the transverse axes of said first, second, and third waveguides, respectively, and first, second, and third transitional waveguides for coupling said ninth, tenth, and eleventh waveguide sections to said first, second, and third waveguides with a minimum of electrical discontinuity, twelfth, thirteenth, fourteenth, and fifteenth waveguide sections forming collinear extensions of said fifth, sixth, seventh, and eighth waveguides, a first and a second dielectric plate in said twelfth waveguide for delaying the phase of $TE_{10}$ and $TE_{01}$ mode electromagnetic waves by 180°, a third and a fourth dielectric plate in said twelfth and fourteenth waveguides, respectively, for delaying the phase of $TE_{10}$ mode electromagnetic waves by 90° and a fifth and a sixth dielectric plate in said thirteenth and fifteenth waveguides, respectively, for delaying the phase of $TE_{01}$ mode electromagnetic waves by 90°.

10. A waveguide network according to claim 9 wherein the apertures in each one of said common walls consist of slots arranged in two rows and having their axes parallel to the longitudinal axes of said waveguide sections, the lines joining the centers of the slots in each of said rows being parallel to the longitudinal centerline of said one of the common walls and equidistant therefrom.

References Cited in the file of this patent

UNITED STATES PATENTS 2,585,173    Riblet              Feb. 12, 1952

FOREIGN PATENTS 582,856    Great Britain        Nov. 29, 1946